US012051011B2

(12) United States Patent
Azmandian et al.

(10) Patent No.: US 12,051,011 B2
(45) Date of Patent: Jul. 30, 2024

(54) HUMAN PERFORMANCE CAPTURING FOR ARTIFICIAL INTELLIGENCE RECOMMENDATIONS

(71) Applicant: Sony Interactive Entertainment Inc., Tokyo (JP)

(72) Inventors: Mahdi Azmandian, San Mateo, CA (US); Xiaoyong Ye, San Mateo, CA (US); Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 668 days.

(21) Appl. No.: 16/837,969

(22) Filed: Apr. 1, 2020

(65) Prior Publication Data
US 2021/0312301 A1    Oct. 7, 2021

(51) Int. Cl.
  *G06N 5/04*     (2023.01)
  *A63F 13/79*   (2014.01)
  *G06N 20/00*   (2019.01)
  *G06V 40/20*   (2022.01)
  *H04L 67/131*  (2022.01)

(52) U.S. Cl.
  CPC .............. *G06N 5/04* (2013.01); *A63F 13/79* (2014.09); *G06N 20/00* (2019.01); *G06V 40/20* (2022.01); *H04L 67/131* (2022.05)

(58) Field of Classification Search
  CPC .......... G06N 5/04; G06N 20/00; A63F 13/79; G06V 40/20; H04L 67/131
  USPC ......................................................... 706/12
  See application file for complete search history.

(56) References Cited

U.S. PATENT DOCUMENTS

| 2014/0012509 A1* | 1/2014 | Barber ................... G06F 3/013 702/19 |
| 2017/0087475 A1* | 3/2017 | Perry ...................... A63F 13/25 |
| 2017/0220104 A1* | 8/2017 | Goslin .................... G06F 3/011 |

(Continued)

OTHER PUBLICATIONS

PCT/US2021/025467, Notification of Transmittal of the International Search Report and the Written Opinion of the International Searching Authority, or the Declaration, PCT/ISA/220, and the International Search Report, PCT/ISA/210, Jul. 14, 2021.

*Primary Examiner* — Hope C Sheffield
(74) *Attorney, Agent, or Firm* — Penilla IP, APC

(57) ABSTRACT

Methods and systems are provided for generating recommendations related to a game. One example method is for generating recommendations for a game executed by a cloud gaming service. The method includes receiving, by a server, sensor data captured during gameplay of the game by a plurality of user, and each of the plurality of sensor data includes intensity information related to reactions made by respective users. The method includes processing, by the server, features from the sensor data and the interactive data from the game when the users played the game. The features are classified and used to build an engagement model that identifies relationships between specific ones of the plurality of sensor data and the interactive data. The method includes processing, by the server, sensor data captured during a current gameplay by a user using the engagement model. The processing is configured to generate a recommendation to the user regarding an action to take to progress in the game during said current gameplay.

20 Claims, 9 Drawing Sheets

(56) References Cited

U.S. PATENT DOCUMENTS

| | | |
|---|---|---|
| 2017/0372585 A1* | 12/2017 | Iv Evangelista ..... G01P 15/0891 |
| 2018/0243656 A1 | 8/2018 | Aghdaie et al. |
| 2020/0066093 A1 | 2/2020 | Schwartz |
| 2020/0075039 A1* | 3/2020 | Eleftheriou .............. G10L 25/63 |
| 2020/0078685 A1 | 3/2020 | Aghdaie et al. |
| 2020/0168036 A1 | 5/2020 | Schwartz |
| 2020/0168037 A1 | 5/2020 | Schwartz |
| 2020/0168038 A1 | 5/2020 | Schwartz |
| 2020/0168039 A1 | 5/2020 | Schwartz |
| 2020/0168040 A1 | 5/2020 | Schwartz |
| 2020/0168041 A1 | 5/2020 | Schwartz |
| 2021/0026440 A1* | 1/2021 | Poupyrev ................. G06F 3/011 |
| 2021/0104211 A1* | 4/2021 | John ........................ G06F 3/017 |
| 2021/0236931 A1* | 8/2021 | Cox .................... A63F 13/5375 |

* cited by examiner

HUMAN PERFORMANCE CAPTURING FOR ARTIFICIAL INTELLIGENCE RECOMMENDATIONS

BACKGROUND

1. Field of the Disclosure

The present disclosure relates to generating recommendations related to a game for a user using sensor data captured during the gameplay of the user, and interactive data associated with the game.

2. Description of the Related Art

The video game industry has seen many changes over the years. The video game industry has been trying to find ways to enhance a user's engagement level in video games in order to increase retention levels and increase video game revenue. To this end, developers have been seeking ways to develop sophisticated operations that would enhance the gaming experience of a user.

A growing trend in video game industry is to track a user's gaming history, purchase history, viewing history, rating history, etc. in order to understand their engagement level and interests with different games to ensure they play more often and for longer periods of time. Understanding the user's engagement level and interests in certain games can help determine which games to recommend to the user. Unfortunately, this approach may be biased or inaccurate and result in game recommendations that may not be consistent with the interests and preferences of a user. As a result, user engagement in video games may decrease which may lead to users playing video games less frequently.

It is in this context that implementations of the disclosure arise.

SUMMARY

Implementations of the present disclosure include devices, methods and systems relating to generating recommendations related to a game being played by a user. In some embodiments, a system and method is provided to enable capturing of player reactions during game play, and using those reactions to characterize actions taking place in video game play. The reactions, in some embodiments, are captured using multiple sensors, and those sensors produce sensor data that is sent to a server that is streaming a game to the user. The sensor data, in this embodiment, includes capture reactions. In some cases, the sensors capture reactions at different times due to sensor delays and/or transmission of the sensor data back to a server of a cloud game system. In such cases, misalignment of sensor data occurs and embodiments described herein teach methods for removing offsets so that sensor data of multiple sensors can be associated to specific content produced and reactions associated with that specific content. Once the alignment is done, the system is configured to analyze the sensor data to identify features that stand out, e.g., such as changes in reaction data that signify that the user is having a particular experience. The changes in reaction can be quantified when sensors identify changes that exceed a predefined threshold. In some embodiments, the reactions can be quantified and measured to determine intensity information. The intensity can be used as feature input to an engagement model that uses one or more classifiers, so that the system learns what type of reactions were indeed significant or of interest to classify during game play. The engagement model can, in one embodiment, can be used to generate recommendations for a player. The recommendations, in one embodiment, are based on what the system predicts a user will find interesting or may illicit a reaction. In some embodiments, the player's own profile and style of play may be used to determine which type of recommendations should be provided to the user.

In one embodiment, a method for generating recommendations for a game executed by a cloud gaming service is provided. The method includes receiving, by a server, sensor data captured during gameplay of the game by a plurality of user, and each of the plurality of sensor data includes intensity information related to reactions made by respective users. The method includes processing, by the server, features from the sensor data and the interactive data from the game when the users played the game. The features are classified and used to build an engagement model that identifies relationships between specific ones of the plurality of sensor data and the interactive data. The method includes processing, by the server, sensor data captured during a current gameplay by a user using the engagement model. The processing is configured to generate a recommendation to the user regarding an action to take to progress in the game during said current gameplay.

In one embodiment, a method for generating recommendations related to a game being executed by a cloud gaming service is disclosed. In this embodiment, the method includes receiving, by a server, a plurality of sensor data captured during gameplay of the game by a user where each of the plurality of sensor data includes intensity information. The method includes aligning, by the server, the plurality of sensor data to remove delays among the plurality of sensor data received by the server, the aligning producing synchronized sensor data. The method includes correlating, by the server, the synchronized sensor data to interactive data being presented in the game while the user is playing the game. The method includes processing, by the server, features from the synchronized sensor data and the interactive data. The features being classified are used by an engagement model to identify relationships between specific ones of the plurality of sensor data and the interactive data. In addition, during gameplay by the user, the user engagement model is used to generate a recommendation that relates to interactive data produced responsive to said gameplay by the user.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
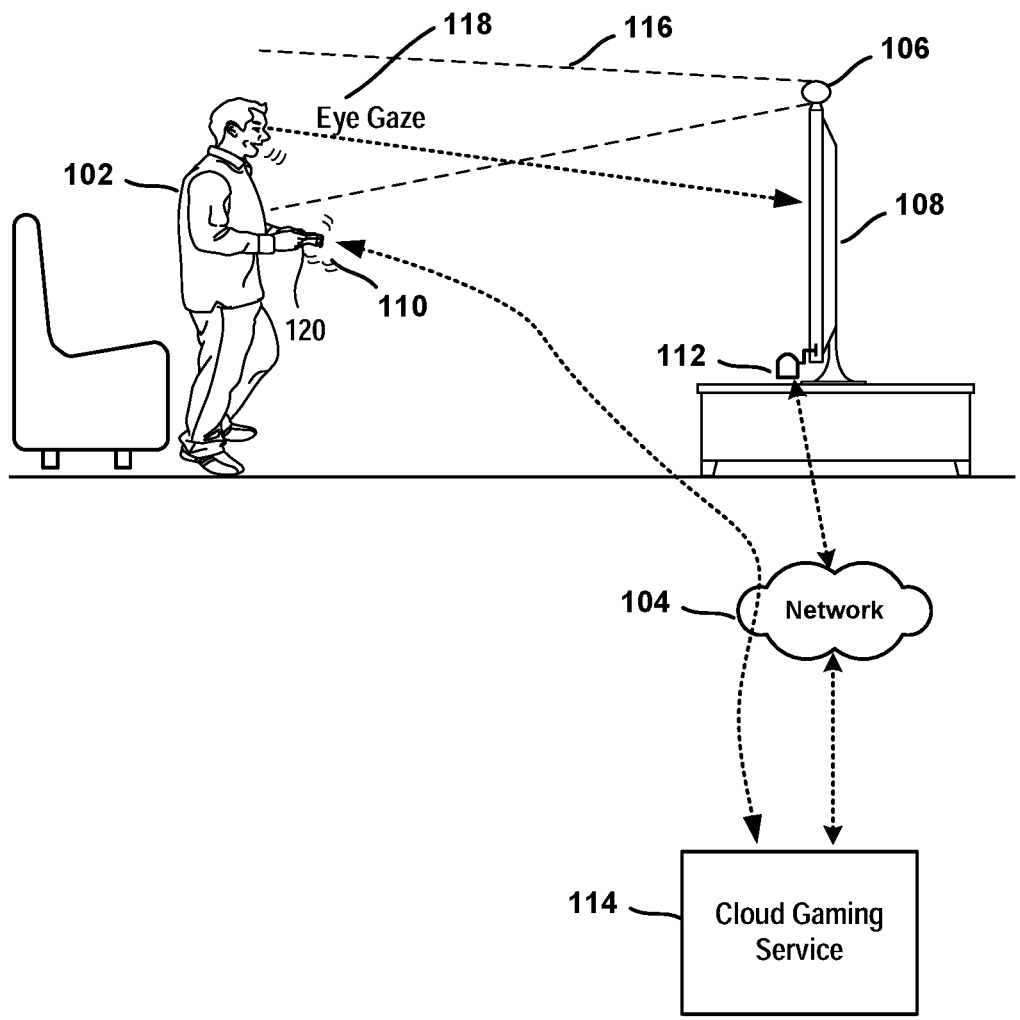
FIG. 1 illustrates an embodiment of a user playing a game in front of a monitor while a plurality of sensors captures the reactions of the user during the gameplay, in accordance with an implementation of the disclosure.

The following implementations of the present disclosure provide devices, methods, and systems for generating recommendations for a user related to a game being executed by a cloud game service. By way of example, generating recommendations for a user is facilitated by a cloud gaming service that processes sensor data captured from a user during gameplay and interactive data that is associated with the gameplay.

In one embodiment, a method is disclosed that enables generating recommendations for a user related to a game played by the user. The method includes receiving a plurality of sensor data captured during a gameplay of the user. In one embodiment, the method includes aligning the plurality of sensor data to remove delays or relative offsets in delay among the plurality of sensor data to produce synchronized sensor data. In still other embodiments, the method further includes correlating the synchronized sensor data to interactive data that is presented in the game while the user is playing the game. The method may also include processing features from the synchronized sensor data and the interactive data which are classified and used by an engagement model to identify relationships in the data. The engagement model may be used to generate a recommendation that relates to the interactive data and is responsive to the gameplay of the user. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for generating recommendations for a user related to a game played by the user. In one embodiment, a system includes a computer that is configured to execute a game being played by a user. During the gameplay, the user may use interface objects such as handheld controllers that enable the user to interact with the game. The system may also include a camera that is used to view the user during gameplay. In some embodiments, the gameplay may be presented on a separate device such as a monitor or television. In some embodiments, the system may include a plurality of sensors that can track the user during the gameplay. The plurality of sensors may enable tracking of the user's eye gaze, facial expression, body movement, voice output, controller input, etc. After capturing the plurality of sensor data during gameplay of the user, the sensor data can be sent to a cloud gaming service over a network for processing.

In accordance with one embodiment, a system is disclosed for generating recommendations related to a game using a plurality of sensor data captured during gameplay of a user. In one embodiment, the system enables capturing user reactions using a plurality of sensors that tracks the user during their gameplay. The sensor data captured by the sensors can be processed to identify one or more features and parameters associated with the sensor data. In some embodiments, the sensor data may include various parameters associated with the gameplay of the user such as content ID data (CID), face expression data (FED), voice inflection data (VID), inertial sensor data (ISD), body movement data (BMD), controller input data (CTL-ID), etc. Once the features associated with the sensor data are processed, the features can be classified using one or more classifiers. In some embodiments, the classified features can be used by an engagement model to predict recommendations that may assist the user during the gameplay and/or provide offline recommendations associated with the gameplay.

In some embodiments, the engagement model may be configured to receive state data associated with the game played by the user. The state data may be generated for the interactive data. In some embodiments, the state data can help capture the context (e.g., actions, scenes, environment, etc.) of the game during gameplay by the user and provide information related to what is occurring in the game that the user is playing. In some embodiments, the engagement model can be created using the state data and/or the sensor data that is associated with a gameplay of the user. In some embodiments, the engagement model may be used to generate recommendations which can be sent to a user that is connected over a network. In accordance with another embodiment, the predicted recommendations may be offline recommendations, real-time recommendations, and/or dynamic real-time recommendations.

In accordance with another embodiment, a plurality of sensors may track and capture one or more user parameters during the gameplay of the user. During the gameplay, a system may be configured to capture a variety of parameters associated with the user such as eye gaze data, facial expression data, voice inflection data, inertial sensor data, body movement data, and controller input data. For example, a scene during a gameplay of a user may initially start off as being uneventful and yield minimal interest to the user. As the user progresses along a different path or stage within the game, the user may spontaneously encounter a villain character that triggers one or more emotions in response to the villain character. In some embodiments, when the user unexpectedly encounters a villain character during the gameplay, the facial expression of the user may change from a neutral expression to a facial expression indicating fear (e.g., eyebrows pulled up and together, upper eyelids pulled up, mouth stretched, etc.). Furthermore, in response the villain character, the user may be startled and react by vocalizing a response (e.g., "oh shoot"), jumping back, vigorously shaking the controller and pressing on the controller buttons. The parameters associated with the emotions of the user may be captured by the plurality of sensors which are then processed and classified. In some embodiments, the captured sensor data may include an associated intensity for each corresponding parameter.

In accordance with another embodiment, a sensor data stream may represent a combination of the plurality of sensor data captured during a gameplay of a user. The sensor data stream may continuously be updated and processed by the system over a period of time. However, there are periods when the sensor data stream is irrelevant and excluded for processing by the system. These periods may include situations when the gameplay of a user is either off or temporarily paused. For example, during a gameplay of a user, the user may pause the game to take a break. While the game is paused, the system continues to receive sensor data associated with the user (e.g., face expression, voice inflection data, inertial sensor data, body movement data, etc.). However, during these periods (e.g., paused or off), the sensor data stream with can be excluded for processing because the data does not accurately represent the user's emotions during the gameplay. Excluding the sensor data stream during these periods ensures that the system processes the sensor data stream data that is representative of the user's emotions during the actual gameplay rather than periods when the user is taking a break or when the game is off.

In accordance with another embodiment, the system includes aligning the plurality of sensor data that is captured during a gameplay of a user. In one embodiment, the plurality of sensor data is aligned or substantially aligned to remove delays or relative offsets among the plurality of sensor data to produce a synchronized sensor data. Aligning the plurality of sensor data can help the system accurately classify features associated with the sensor data. For example, in response to a villain character during a game, the system may capture a plurality of sensor data associated with the reaction of the user such as content ID data (CID), face expression data (FED), voice inflection data (VID), inertial sensor data (ISD), body movement data (BMD), controller input data (CID), etc. During the capturing process, the sensor data are substantially aligned and corresponds to a reaction (e.g., scared, fear, etc.) to a specific element (e.g., villain character) in the gameplay. Accordingly, after aligning the plurality of sensor data, the aligned sensor data produces a synchronized sensor data.

In accordance with another embodiment, the system may correlate the synchronized sensor data to interactive data (e.g., game state data) that is presented in the game while the user is playing the game. In some embodiments, the server receives the interactive data and the synchronized sensor data at different points in time due to delays associated in transmitting the data. When the server receives the interactive data and the synchronized sensor data, the server may need to correlate it with one another so that both datasets correspond to each other. For example, the interactive data may represent a state in the game that includes a villain character attacking the user in the game. However, the synchronized sensor data may be associated with a state in the game when the user is reacting (e.g. smiling) to a new weapon that was acquired during some point in the gameplay. Because the synchronized sensor data and the interactive data does not correspond to each other, the system may need to correlate the synchronized sensor data with the interactive data so that the user's reaction (e.g. smiling) is associated with the actual state of the game (e.g., acquiring new weapon).

In accordance with another embodiment, an engagement model is configured to receive the synchronized sensor data and the interactive data associated with the gameplay of the user. In accordance with some embodiments, the engagement model can be used to generate recommendations that are responsive to the synchronized sensor data and the interactive data of the gameplay.

In one embodiment, the engagement model can be used to generate offline recommendations for a user. In this embodiment, after receiving the synchronized sensor data and the interactive data as inputs, the engagement model can be used to generate a user profile based on the received inputs. The user profile can include various attributes associated with the user such as the user's interests, preferences, likes, dislikes, gaming experience and skill level, etc. For example, the synchronized sensor data and interactive data associated with a user may indicate that the user reacts positively to games involving a first-person shooter. Accordingly, using this information, the engagement model may be used to recommend other games involving first-person shooters and/or other games centered on weapon-based combat.

In another embodiment, the engagement model can be used to generate real-time recommendations for a user. In this embodiment, a system may include a user playing a game and a plurality of sensors that are used to capture the user's reactions in response to the gameplay. The system may include gaming servers that can be configured to receive the plurality of sensor data over a network. In some embodiments, the gaming servers can be connected to the engagement model. After processing the plurality of sensors to produce the synchronized sensor data, the engagement model can be configured to receive the synchronized sensor data as an input. In another embodiment, the gaming servers may be configured to receive, process, and execute the gameplay of the user. In one embodiment, the engagement model may be configured to receive from the game servers interactive data that is associated with the gameplay of the user. Using the synchronized sensor data and the interactive data as inputs, the engagement model can be used to generate real-time recommendations for the user to assist the user with their gameplay.

In some embodiments, the real-time recommendations may include in-game recommendations that can help the user progress and/or advance levels in the game. For example, when a user encounters a "boss character" in the gameplay, the user may be not know how to proceed. After the processing the synchronized sensor data and the interactive data, the engagement model may be used to determine that the user is panicking and uncertain how to proceed in the gameplay. In real-time, the engagement model may be used to generate and provide the user with a recommendation (e.g., "Use your sword to defeat the villain!") on how to defeat the boss character.

In another embodiment, the engagement model can be used to generate dynamic real-time recommendations. In this embodiment, the system may include one or more users playing a game. The system may include gaming servers that can be configured to receive sensor data captured during the gameplay of the user. After aligning the sensor data to produce the synchronized sensor data, the synchronized sensor data can be received by the engagement model to process attributes associated with the synchronized sensor data. In another embodiment, the engagement model may be configured to receive the interactive data associated with the gameplay from the game servers. Using the synchronized sensor data and the interactive data, the engagement model can be used to generate dynamic real-time recommendations (e.g., adjusting game code to make it easier or harder for the user) to enhance the gameplay experience of the user.

With the above overview in mind, the following provides several example figures to facilitate understanding of the example embodiments.

FIG. 1 illustrates an embodiment of a user 102 playing a game in front of a monitor 108 while a plurality of sensors captures the reaction of the user during the gameplay. As illustrated in the figure, user 102 is shown standing in front of the monitor 108 playing a game. The user 102 can play the game using a controller 110 which provides input to the game. A computer 112 is connected to the monitor 108 through a wire connection. A camera 106 is positioned on top of the monitor 108 and configured to capture the user playing the game while the user is immersed in the gameplay. The camera 106 includes a camera point of view (POV) 116 that captures any objects within its POV. According to the embodiment shown, the computer 112 can communicate with a cloud gaming Service 114 through network 104.

The camera 106 may include gaze tracking to enable tracking of the gaze of the user 102. The camera 106 captures images of the user's eyes, which are analyzed to determine the gaze direction of the user. In some embodiments, the camera 106 may be configured to track and capture a facial expression of the user 102 during the gameplay which is analyzed to determine an emotion associated with the facial expression. In some embodiments, the camera 106 may be configured to capture and process body movements of the user 102 during the gameplay. For example, during the gameplay of the user 102, the user may be fully immersed in the game and not realize that the user moved around in various angles and directions throughout the gameplay. In some embodiments, the camera 106 may be mounted on a 3-axis gimbal that allows the camera to rotate freely about any axis to enable the capturing of various angles of the user. In one embodiment, the camera 106 may be a pan-tilt-zoom camera which can be configured to automatically zoom in and track the user's face and body as the user moves during the gameplay.

In some embodiments, the controller 110 can include one or more microphones 120 to capture sound from the environment where the game is being played. The sound captured by the microphone may be processed to identify the location of a sound source. Sound from an identified location can be selectively utilized or processed to the exclusion of other sounds not from the identified location. This information can be utilized in various ways, including exclusion of unwanted sound sources, association of a sound source with a visual identification, etc.

In some implementations, the controller 110 can be tracked by tracking lights included in the controller 110, or tracking of shapes, sensors, and inertial data associated with the controller 110. In various implementations, the controller 110 includes a light which can be tracked, and/or inertial sensor(s), to enable determination of the controller's location and orientation and tracking of movements.

After the computer 112 capture various parameters (e.g., eye gaze data, face expression data, voice inflection data, inertial sensor data, body movement data, controller input data) associated with the user 102 during the gameplay, the data can be transmitted to the cloud gaming Service 114 through network 114. In some embodiments, the cloud gaming Service 114 can receive, process, and execute the sensor data from the user 102.

Figure 2:
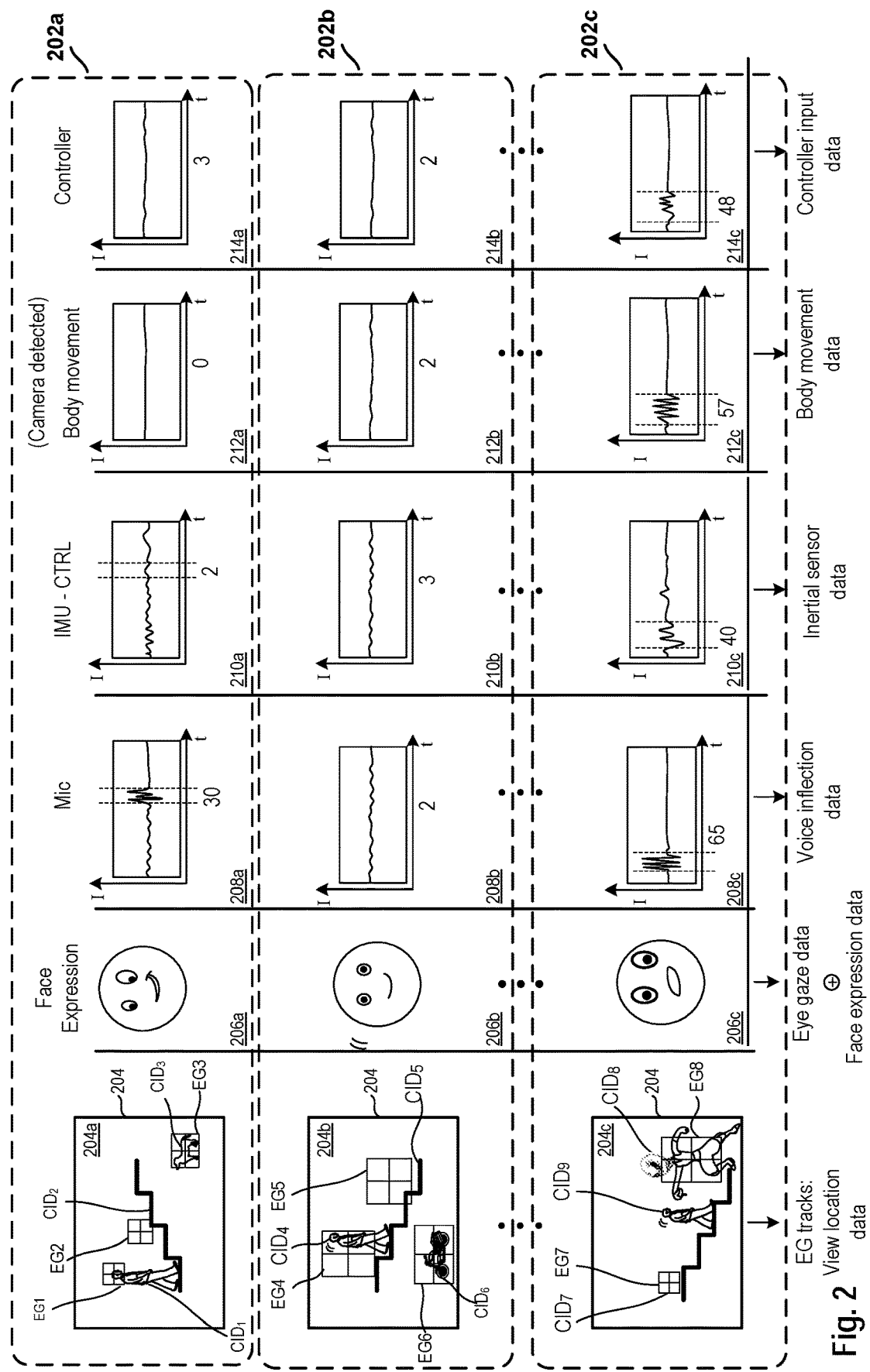
FIG. 2 illustrates an embodiment of multiple scenes in a game and tracking the reactions of the user during the gameplay, in accordance with an implementation of the disclosure.

FIG. 2 illustrates an embodiment of multiple scenes (e.g., 202a, 202b, 202c) in a game and the tracking of the user's reactions during the gameplay. As illustrated, the figure shows a first scene 202a, a second scene 202b, and a third scene 202c. Each scene includes a game content 204 that provides a view into the game, and a plurality of parameters (e.g., reactions) that are captured by sensors (e.g., camera, microphone, controller) when the user 102 views the game content 204.

As illustrated in the first scene 202a, a game content 204a illustrates an avatar (e.g., $CID_1$) of the user 102 walking up a set of stairs (e.g., $CID_2$), and a dog ($CID_3$). When the user 102 views the game content 204a, the eye gaze 118 of the user 102 is tracked and regions within the game content 204a are highlighted to indicate the location of the user's 102 eye gaze, e.g., $EG_1$, $EG_2$, $EG_3$, etc. For example, the game content 204a shows that the user's eye gaze was initially directed towards the avatar (e.g., $EG_1$) which then makes its way to towards the stairs (e.g., $EG_2$) and the dog (e.g., $EG_3$).

As further illustrated in the first scene 202a, while viewing the game content 204a, the reactions of the user 102 may be tracked and measured. A facial expression 206a and eye gaze 118 of the user 102 can be captured by the camera 106 to capture the emotion and reaction of the user 102 while viewing the game content 204a. In this example, the user's facial expression data 206a and eye gaze 118 indicates that the user 102 is smiling which can be inferred that the user is happy. The first scene 202a may also include voice inflection data (VID) 208a that is captured by the microphone 120. In some embodiments, the VID 208a may include intensity information with an associated intensity value to help determine a level of engagement of the user 102. In some embodiments, the intensity value may range from a minimum value of zero to a maximum value of 100. As illustrated, the VID 208a shows an intensity value of "30." In one embodiment, the intensity value can be based on the context and meaning of the words spoken by the user 102. For example, when viewing the game content 204a, the gaze of the user 102 may be directed towards the dog (e.g., $EG_3$). While looking at the dog, the user 102 may verbally express "wow, that's a cute dog." The microphone 120 may capture the words and the associated intensity information which is processed to determine the user's level of engagement.

As further illustrated in the first scene 202a, inertial sensor data (ISD) 210a may be captured by the microphone 120. In some embodiments, the ISD 210 may include intensity information with an associated intensity value to help determine the level of engagement of the user 102. This intensity value may range from a minimum value of zero to a maximum value of 100. As illustrated in the figure, the intensity for ISD 210a has intensity value of "2" because the controller's movement, force, and orientation may be nominal during the user's gameplay of the first scene 202a.

In another embodiment, the first scene 202a may also include an associated body movement data (BMD) 212 that can be captured by the camera 106. In some embodiments, the BMD 212 may include intensity information with an associated intensity value to help determine a level of engagement of the user 102. As noted above, this intensity value may range from a minimum value of zero to a maximum value of 100. As illustrated in the figure, the BMD 212a results in an intensity value of "0" because the user 102 may be standing still or in a seated position during the user's gameplay of the first scene 202a.

The first scene 202a may also include an associated controller input data (CTL-ID) 214 that is captured by the inputs received from the controller 110. For example, as shown in the figure, the intensity for CTL-ID 214a results in an intensity value of "3" because the controller inputs provided by the user 102 may be insignificant because the user 102 is only providing sufficient inputs to zoom in to focus on the dog ($CID_3$).

According to another embodiment, as shown in FIG. 2, the second scene 202b includes a game content 204b and the reactions of the user 102 when viewing and/or controlling the game content 204b. As shown in the game content 204b, the scene illustrates an avatar (e.g., $CID_4$) of the user 102 walking down a flight of stairs (e.g., $CID_5$) and a motorcycle (e.g., $CID_6$) positioned below the stairs. As indicated in the game content 204b, the eye gaze 118 of the user is initially directed towards the avatar (e.g., $EG_4$) which then makes its way towards the stairs (e.g., $EG_5$) and then to the motorcycle (e.g., $EG_6$). In some embodiments, the second scene 202b includes one or more reactions of the user that are responsive to the game content 204b. For example, as shown in the figure, the reactions may include parameters such as eye gaze data, facial expression data (FED) 206b, VID 208b, ISD 210b, BMD 212b, and CTL-ID 214b. As noted above, in some embodiments, each reaction may include intensity information with an associated intensity value that ranges from a minimum value of zero to a maximum value of 100. In some embodiments, the intensity value may help determine the level of engagement of the user 102 when viewing the game content 204.

According to another embodiment, as shown in FIG. 2, the third scene 202c includes a game content 204c and the reactions of the user 102 when viewing the game content 204c. The game content 204c illustrates an avatar (e.g., $CID_9$) of the user 102 walking down a flight of stairs and a villain monster (e.g., CIDs) attacking the avatar. As shown in the game content 204c, the eye gaze 118 of the user 102 is initially directed towards the top of the stairs (e.g., $EG_7$) which then makes its way towards the bottom of the stairs and then to the villain monster (e.g., $EG_8$). When the user 102 sees the villain monster, the user's reaction to the villain monster is captured by the plurality of sensors that are used to track the user 102.

As illustrated in facial expression 206c, the facial expression of the user indicates an emotion of being freighted, surprised, scared, etc. In addition, the figure illustrates the VID 208c that is captured by the microphone 120. VID 208c shows a sound intensity value of "65." As noted above, the sound intensity value can be based on the context and meaning of the words spoken by the user 102. For example, when the user 102 sees the villain monster, the user 102 may verbally scream out loud "Oh shoot! What is that?" In some embodiments, the system may take into the consideration the context of the game, the meaning of the words, and how loud the words are spoken when determining the sound intensity value.

As further shown in the figure, ISD 210c, BMD 212c, and CTL-ID 214c are illustrated with their corresponding intensity values, e.g., 40, 57, and 48, respectively. When the villain monster attacks the user 102, the user may instinctively react by jumping back while vigorously shaking the controller and pressing on the controller buttons to avoid the villain monster. These reactions may be captured by the one or more sensors tracking the user during the gameplay which can be used to determine the level of engagement of the user 102.

As noted above, each of the plurality of sensor data includes intensity information related to reactions made by respective users. In one embodiment, the intensity information can be associated with a change in reaction from the plurality of users when measured by the plurality of sensors. In some embodiments, the change in reaction can be identified from two or more of the sensor data captured and occurring at substantially a same time frame. In one embodiment, the intensity information associated with the sensor data can be processed to define standardized values of intensity. The standardized values of intensity can be comparable for different types of reactions captured by the different plurality of sensors. In some embodiments, the change in intensity information can be standardized among the plurality of sensors to identify when the change in intensity information exceeds a predefined threshold. This may help the system determine what type of reactions are significant or of interest to during game play.

Figure 3:
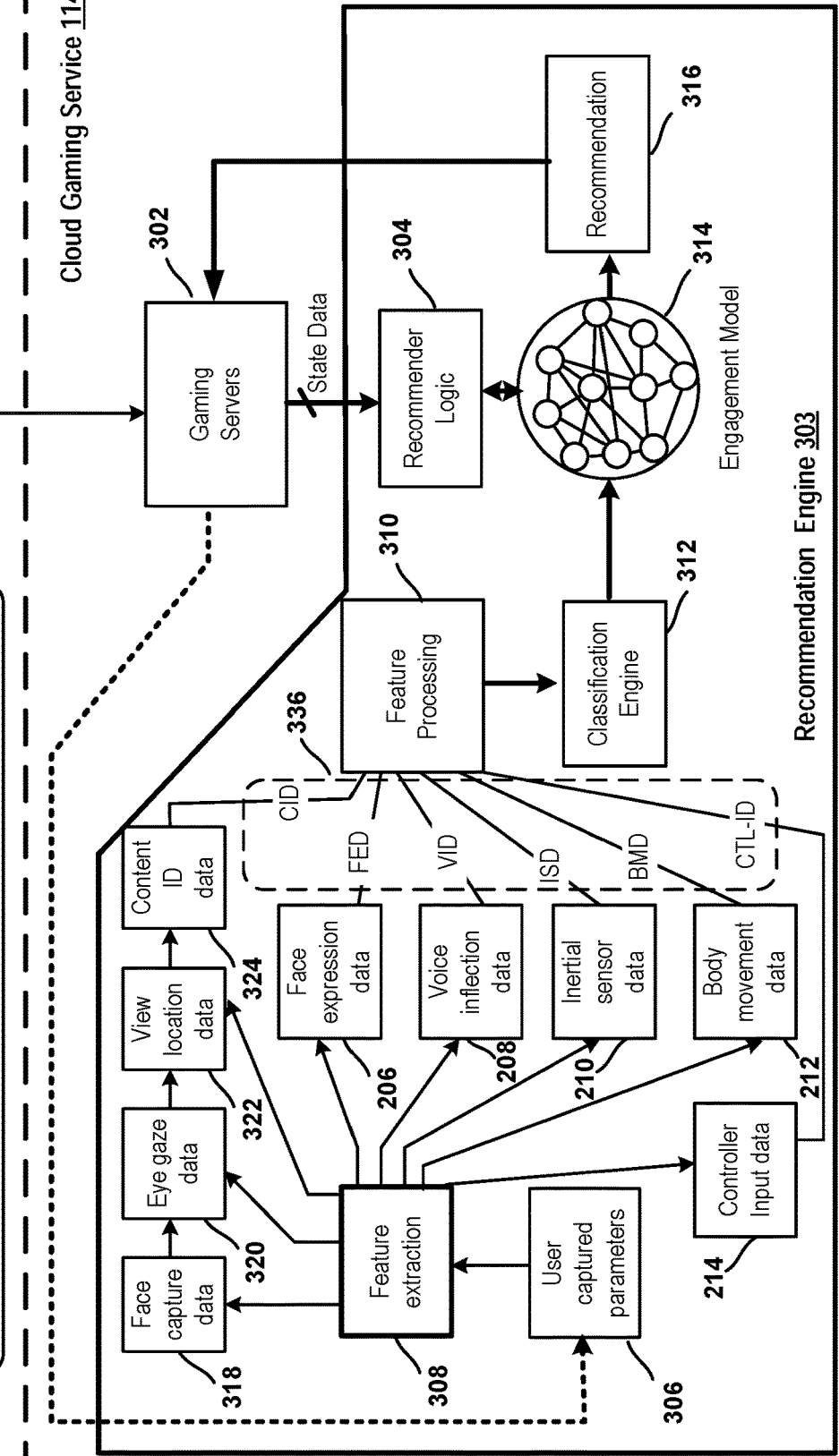
FIG. 3 illustrates an embodiment of a cloud gaming service receiving a plurality of sensor data captured during a gameplay of a user and executing recommendations for the user based on the gameplay, in accordance with an implementation of the disclosure.

FIG. 3 illustrates an embodiment of a cloud gaming service 114 receiving a plurality of sensor data captured during a gameplay of a user and executing recommendations for the user based on the gameplay. As shown in FIG. 3, the system includes a plurality of users 102 connected to cloud gaming service 114 over network 104. In one embodiment, the user 102 may be playing a game is be able to view the gameplay on a separate device such as a monitor or television. In some embodiments, the user 102 may be playing a virtual reality game using a head-mounted display (HMD) while being immersed in a virtual environment during the gameplay. The users 102 can be configured to send game commands to game servers 302 through the network 104. In some embodiments, the users 102 can be configured to receive encoded video streams and decode the video streams received from the game servers 302.

In one embodiment, the users 102 may be connected to a plurality of sensors that are configured to track and capture data associated with the user's reaction to the gameplay. The system can be configured to send the plurality of sensor data to the cloud gaming service 114 through the network 104 for processing. In one embodiment, the cloud gaming service 114 can include gaming servers 302 and a recommendation engine 303. The gaming servers 302 may be configured to receive, process, and execute data from a plurality of users 102. In one embodiment, the game servers 302 can execute the game and enable connections between the users 102 and the recommendation engine 303 during the gameplay.

In one embodiment, the recommendation engine 303 may include a user captured parameters 306 operation and a feature extraction 308 operation. After processing the parameters, the recommendation engine 303 may include a feature processing 310 operation that is configured to receive the one or more user captured parameters as inputs. After the feature processing 310 operation identifies features from the user captured parameters, a classification engine 312 may be configured to classify the features using one or more classifiers. In another embodiment, the recommendation engine 303 may also include an engagement model 314 that is configured to receive the classified features from the classification engine 312. In some embodiments, the engagement model 314 may be configured to receive general recommendations from recommender logic 304. Using the classified features and the general recommendations as inputs, the engagement model 314 can be used to generate recommendations 316 for the user 102 which can be provided to the user 102 in real-time and/or offline.

In one embodiment, the captured parameters 306 operation can be configured to receive a plurality of sensor data captured during the gameplay of a user 102. For example, a user 102 may be playing a virtual reality game using a head-mounted display (HMD) and a controller 110 to interact with the game. While immersed in the virtual reality environment, the user 102 may move in various angles and directions. The HMD and the controller 110 may include magnetic sensors that are configured to detect its magnetic field (e.g. strength, orientation) as the user plays the game. The sensor data captured by the HMD and controller can be received by the captured parameters 306 operation and used to determine the various movements and inputs of the user 102 during the gameplay.

In another embodiment, the feature extraction 308 operation can be configured to process the plurality of sensor data captured from the user 102 during the gameplay. The feature extraction 308 operation can identify and categorize the captured sensor data. In some embodiments, the output of the feature extraction 308 operation can include a plurality of parameters associated with the user's gameplay such as face capture data 318, eye gaze data 320, view location data 322, content ID data (CID) 324, facial expression data (FED) 206, voice inflection data (VID) 208, inertial sensor data (ISD) 210, body movement data (BMD) 212, and controller input data (CTL-ID) 214.

In some embodiments, the face capture data 318 can be captured by a camera 106 that is configured to track and capture the orientation and motion of the user's face during the gameplay. In some embodiments, the face capture data 318 may be used to identify eye gaze data 320, view location data 322, content ID data (CID) 324. For example, during the gameplay, the camera 106 can track the various movements and orientation of the user's face including the eye gaze location of the user. While playing the game, the user may focus only on certain aspects of the particular scene while ignoring others because of the user's lack of interest. Accordingly, the system can capture the user's eye gaze data 320 and view location data 320 by tracking the direction of the user's eye gaze. Using the eye gaze data 320 and the view location data 320, the system can determine the specific content (e.g., CID 324) within the scene the user is looking at.

In some embodiments, the FED 206 can be obtained by a camera 106 that is configured to track and capture the user's face during the gameplay. The FED 206 can be used to determine various emotions that the user 102 may experience during the gameplay. These emotions can include, without limitation, e.g., fear, sadness, happiness, anger, etc. For example, a user 102 may be playing a fighting game against an opponent. During the gameplay, the user 102 may experience various emotions throughout the game. When progressing in the gameplay, the user's facial expression may indicate an emotion of happiness and/or excitement. Conversely, when the user 102 struggles with the gameplay, the user's facial expression may indicate an emotion of sadness and/or anger. These various emotions can be inferred by the facial expression that the user 102 makes during the gameplay which may be included in the FED 206 for further processing.

In some embodiments, the VID 208 can be captured by a microphone 120 that is incorporated into a controller 110 to capture sound from the environment the user 102 is playing in. The sounds and words spoken by the user 102 can be used to determine a level of engagement, excitement, interest, disinterest, etc. in the particular game that the user 102 is playing. For example, a user 102 may be playing a racing game for the first time and verbally express, "wow, this is so much fun, the graphics are amazing." This statement can be captured by the microphone 120 and included in the VID 208 for processing to help generate recommendations (e.g., tips to progress to the next level, controller combinations to drive faster, other related racing games, etc.) for the user 102. In accordance with another embodiment, as noted above, the ISD 210 can be captured by inertial sensors from the controller 110. The inertial sensors can enable a determination of the controller's location and orientation and tracking of movements.

In some embodiments, the BMD 212 can be captured by a camera 106 that is configured to track the user's body movements during the gameplay. The BMD 212 can be used to determine a level of engagement, excitement, interest, disinterest, etc. in the gameplay. In some embodiments, the user's body language can infer a non-verbal type of communication and various emotions associated with the gameplay. For example, while playing a game, when a user jumps in the air and extends their arms towards the air, this may indicate that the user is excited, happy, thrilled, etc. Conversely, when a user grasps their head with their hands, this may indicate that the user is flustered, angry, upset, sad, etc. Using this data, the BMD 212 can be processed and used to infer the user's emotion associated with the gameplay. Understanding the user's emotions during a gameplay can help generate recommendations that can assist the user with the gameplay.

In some embodiments, the CTL-ID 214 may include the controller inputs of the user 102 during the gameplay. In some embodiments, the CTL-ID 214 can help determine whether the user 102 needs assistance during the gameplay. For example, if a user 102 arbitrarily presses a series of buttons on the controller 110 that does not make sense, the system can infer that the user 102 is an inexperience player who may need help with the gameplay. In such situations, a real-time recommendation (e.g., press "L1" to scroll through weapons and "L2" to select desired weapon) can be generated and provided to the user 102 to assist the user with the gameplay.

In some embodiments, sensor data stream 336 may include CID 324, FED 206, VID 208, ISD 210, BMD 212, and CTL-ID 214, or any combination thereof. In one embodiment, the sensor data stream 336 may be an input to a feature processing 310 operation. In some embodiments, the feature processing 310 operation is configured to process the sensor data stream 336 and to identify features associated with the user's reaction in response to the gameplay. By way of example, these features may include the user's interest in specific game genres, user's face expression during gameplay (e.g., neutral, focused, animated, etc.), user's body movement (e.g., minimal movement, highly reactive, etc.), user's biometrics (e.g., sweaty palms, high pulse rate, etc.), etc.

In some embodiments, the plurality of sensor data within the sensor data stream 336 may be unaligned with respect to one another after being captured and processed. Accordingly, the feature processing 310 operation may be configured to substantially align the plurality of sensor data within the sensor data stream 336 to produce a synchronized sensor data. In some embodiments, the feature processing 310 operation can remove delays among the plurality of sensor data so that the features can be accurately classified. In some embodiments, the feature processing 310 operation can remove delays by applying a delay offset to the plurality of sensor data and/or by using a machine learning model that has been trained to align the sensor data.

After the features are identified by the feature processing 310 operation, the classification engine 312 is configured to classify the features and attributes associated with the user 102. In some embodiments, the features are labeled using a classification algorithm for further refining by the engagement model 314. In some embodiments, the classification engine 312 can receive the synchronized sensor data as an input. Since the plurality of sensor data are synchronized, the classification engine 312 can make sense of the sensor data and accurately classify the features of the user 102. For example, during gameplay, when the eye gaze (e.g., eye gaze data) of a user is directed towards a villain character (e.g. content ID data), the user's facial expression (e.g., facial expression data) may indicate that the user is frightened or scared. Because the eye gaze data and the facial expression data are synchronized with each other, the classification engine 312 can accurately classify these features to infer that the user is scared of the villain character.

In some embodiments, the recommender logic 304 is configured to receive state data from gaming servers 302. The state data identifies all of the actions, inputs, and moves made by the user 102 during user's 102 gameplay session. Using the state data, the recommender logic 304 knows the current state of the gameplay, the context of the game, and the upcoming scenes. In some embodiments, the recommender logic 304 can be pre-programmed to make general recommendations and strategies on how to proceed with the gameplay (e.g., which weapon to use to advance to the next level). The general recommendations and strategies can be provided to the engagement model 314 which can be received as an input.

In some embodiments, the engagement model 314 can be configured to receive as inputs the recommendations from the recommender logic 304 and the classified features from the classification engine 312. Using these inputs, the engagement model 314 can be used to generate recommendations 316 which can be provided to the user 102 in real-time during gameplay and/or offline. In some embodiments, the recommender logic 304 and the engagement model 314 can be configured to communicate with each other. For example, the recommender logic 304 can provide the engagement model 314 with general recommendations related to the gameplay and the engagement model 314 may have the discretion to ignore the recommendation or use it when a request is sent to the engagement model to provide a recommendation. In some embodiments, the engagement model 314 can be used to send a request to the recommender logic 304 to request an update and/or additional recommendation. This back and forth communication between the recommendation 316 and the engagement model 314 can be an iterative process until the engagement model 314 reaches an appropriate recommendation which can be used to provide a recommendation for the user.

In some embodiments, the engagement model 314 may initially be based on a global model which can be trained using global features of other users that are similar to the user 102. Over time, based on the user's 102 captured sensor data, the model will be trained to understand the user's 102 tendencies, reactions, level of engagement, etc. which can be used to build a user profile. Accordingly, the engagement model 314 is built over time and becomes more specific to the user 102. As the engagement model 314 receives more datasets, the engagement model 314 improves and the accuracy of the generated recommendations 316 improves and becomes more useful and applicable to the user 102. In some embodiments, the reactions of the user 102 can be captured by one or more sensors of a user device of the user and fed back to the server to improve the engagement model.

In some embodiments, the recommendations 316 may be of significance and/or helpful to the user 102 during the gameplay. In one embodiment, the predicted recommendation 316 may be offline recommendations, real-time recommendations, and/or dynamic real-time recommendations. These recommendations may be sent to the gaming servers 302 and to the user 102 through the network 104. In one embodiment, the recommendation is feedback to the user during the gameplay. The recommendation may include information that is based on a prediction of actions that would improve results in the gameplay by the user based on a current context of gameplay by the user and reactions captured by the user.

In another embodiment, the recommendations 316 can help guide the narrative of the gameplay without the user's knowledge as the user 102 plays the game. For example, the engagement model 314 can be used to determine that the user 102 is bored or overwhelmed with a scene in the game. To make the game more appealing to the user 102, the engagement model 314 can be used to generate recommendations to adjust the game code to make the game more interesting, e.g., adding enemy characters or reducing enemy characters in the game. The recommendations can be done seamlessly without the user's knowledge and without interrupting the gameplay of the user 102.

Figure 4A:
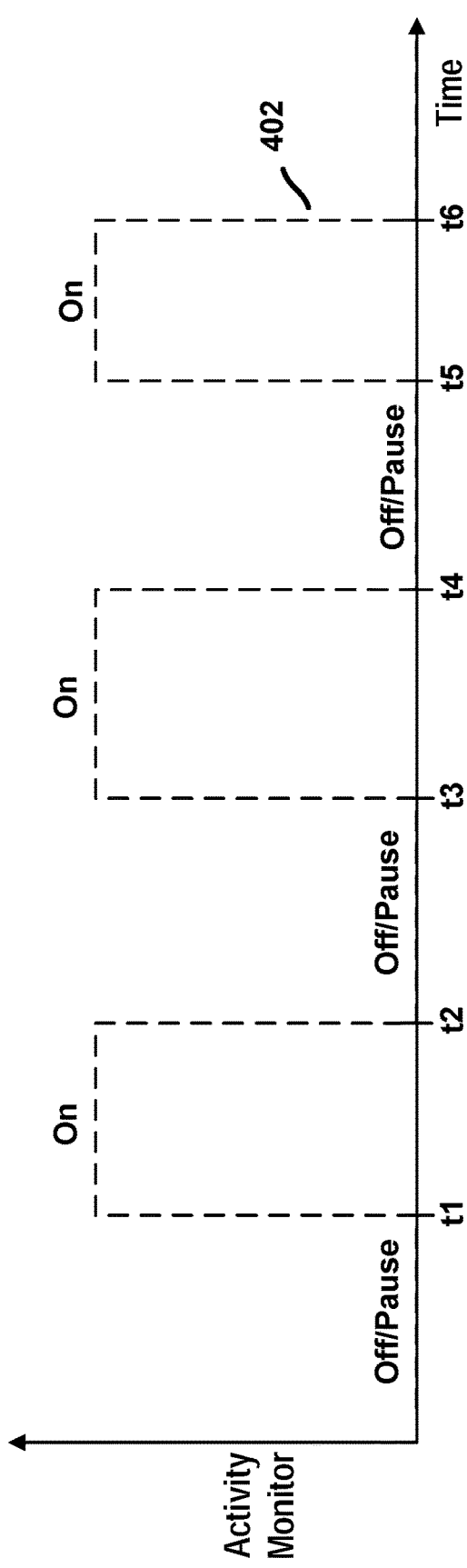
FIGS. 4A and 4B illustrate an activity monitor graph of a gameplay of a user and the sensor data stream activity over a period of time, in accordance with an implementation of the disclosure.
Figure 4B:
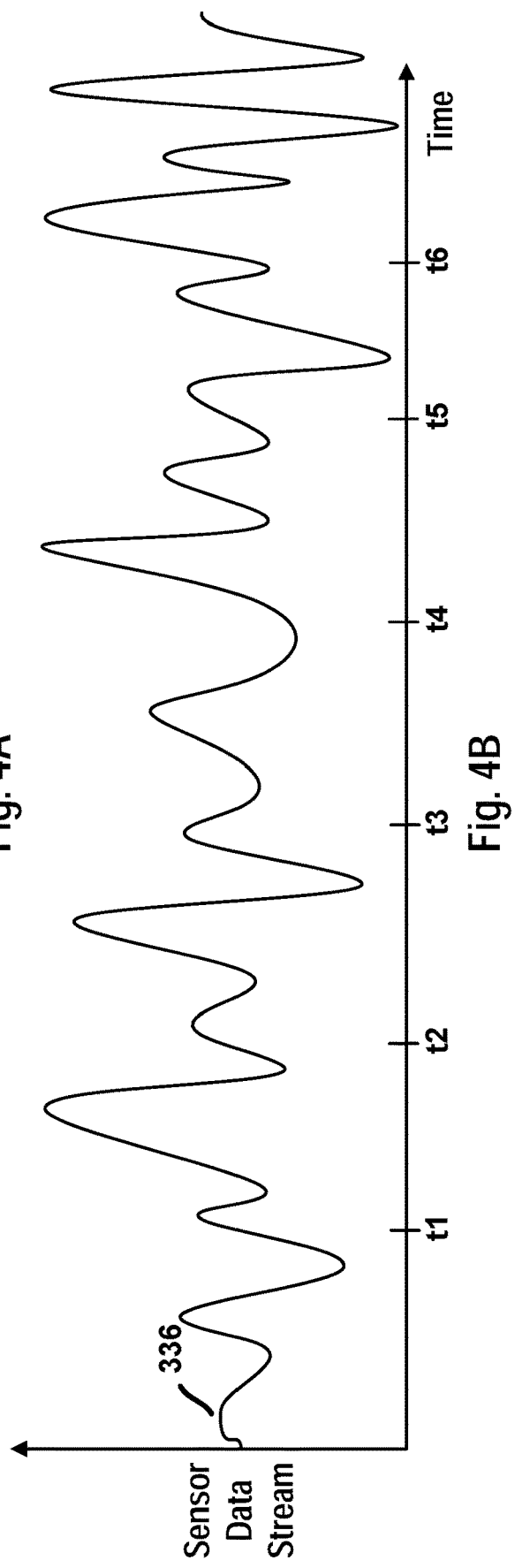

FIGS. 4A and 4B illustrate an activity monitor graph of a gameplay of a user 102 and the sensor data stream activity over a period of time, respectively. In one embodiment, when the user 102 plays a game, game stream content 402 is generated over a period of time. However, there are periods during the gameplay when the user 102 temporarily pauses the game or turns the game off (e.g., t1-t2, t3-4, and t5-t6). During these periods (e.g., on/off), the sensor data stream 336 is still captured by the cloud gaming service 114 which can cause inaccuracies in the engagement model 314. Accordingly, in some embodiments, the sensor data stream 336 may be excluded from processing (e.g., t1-t2, t3-4, and t5-t6) when the gameplay by the user 102 is temporarily paused or off.

For example, as shown in FIG. 4A, during the gameplay, a user may pause the game to answer a phone call, e.g., t3-t4. While talking on the phone, the user's body movements and phone conversation continue to be captured by the camera 106 and microphone 120, respectively. Accordingly, the sensor data stream activity at time t3-t4 may be irrelevant to the gameplay and can be excluded from processing. Therefore, filtering out segments of irrelevant sensor stream data may help ensure that the engagement model 314 is training on relevant data which can help improve the accuracy of the engagement model 314.

Figure 5:
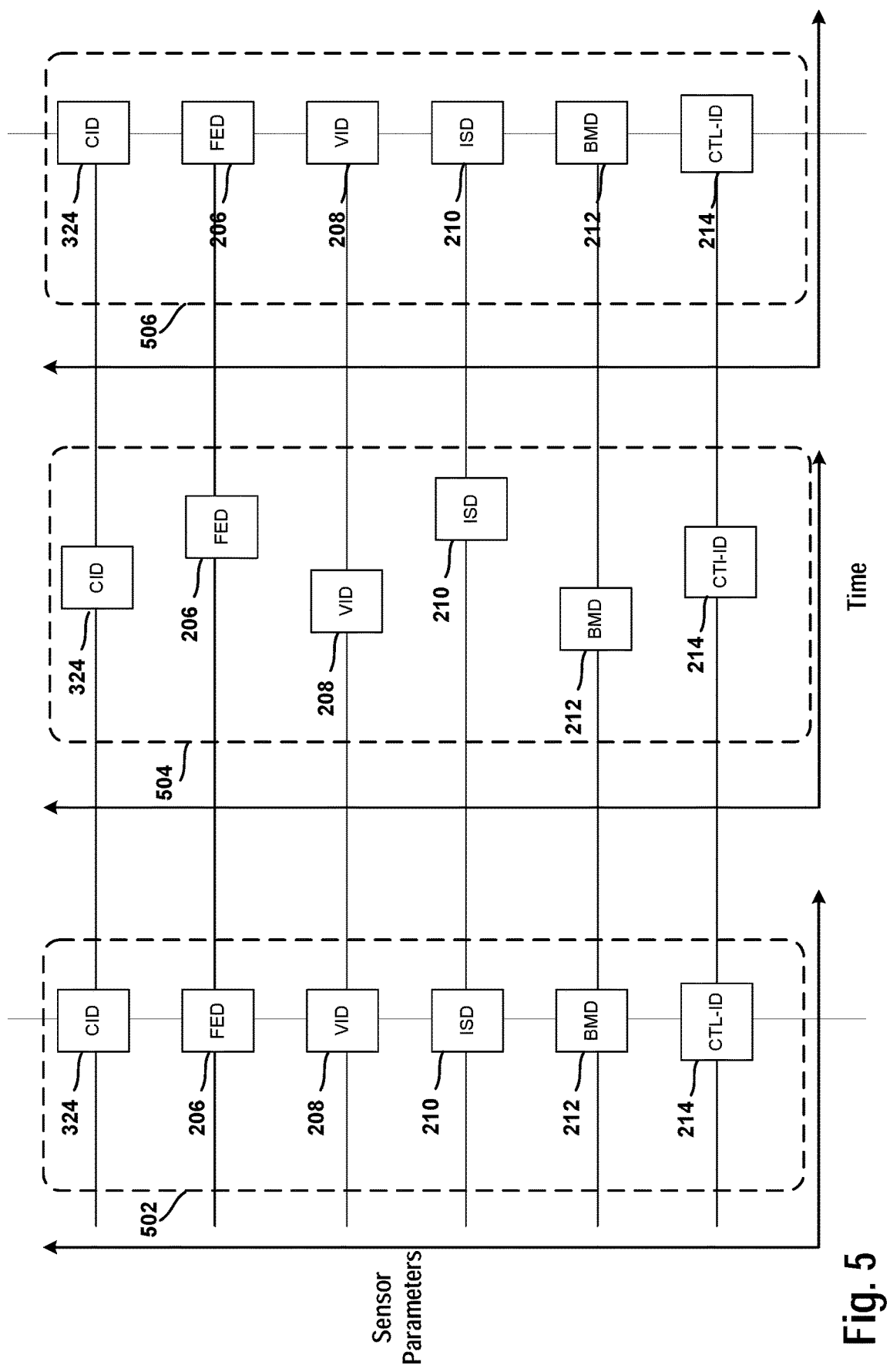
FIG. 5 illustrates an embodiment showing a timeline of the sensor data when captured, during misalignment, and after being synchronized, in accordance with an implementation of the disclosure.

FIG. 5 illustrates an embodiment illustrating a timeline of the sensor data when captured, during misalignment, and after being synchronized. In some embodiments, during a gameplay of the user 102, the sensor data is captured during the user's gameplay. As shown in the figure, the sensor data may include CID 324, FED 206, VID 208, ISD 210, BMD 212, and CTL-ID 214. In some embodiments, at the time of capturing, the sensor data may be aligned (e.g., capture time alignment 502) with respect to each other. After capturing the sensor data, the sensor data may be transmitted for processing. However, when the sensor data is transmitted and received by the featuring processing 310 operation, the sensor data may be misaligned (e.g., sensor receive delay misalign 504). The misalignment of the sensor data may result in inaccuracies when the features of the sensor data are classified by the classification engine 312. Accordingly, in some embodiments, the featuring processing 310 operation can synchronize the sensor data such that the sensor data are substantially aligned with respect to one another (e.g., synchronized sensor data 506).

For example, a user may be playing a car racing game and the user's reaction is captured during the gameplay. When the user speeds up to overtake the lead in the race (e.g., CID 324), the user's FED 206 may indicate an emotion of excitement, and the user's VID 208 may capture the user saying "yes!, I'm going to win." In this example, if the CID 324, FED 206, and VID 208 are misaligned, it may be difficult to infer and classify the features of the sensor data. However, if the sensor data is synchronized with respect to one another, the classification engine 312 can classify the features and infer that the user 102 is expressing an emotion of excitement when taking the lead in a racing game.

In some embodiments, the synchronized sensor data 506 can be performed by the feature processing 310 operation. The feature processing 310 operation can remove delays by applying a delay offset to the plurality of sensor data and/or by using a machine learning model that has been trained to align the sensor data. In some embodiments, the machine learning model can learn the relative offsets of each individual sensor data and apply the necessary delay offset adjustments to the individual sensor data so that they are substantially aligned. For example, the delay offset adjustments may include slowing down and/or speeding up the individual sensor data. In some embodiments, the aligning can be performed by the machine learning model that learns delays in receipt of the sensor data by the server. In one embodiment, the plurality of sensor data can be aligned by applying a delay weighting to the one or more sensor data to adjust for offsets to cause the plurality of sensor data to substantially align with respect to one another.

Figure 6:
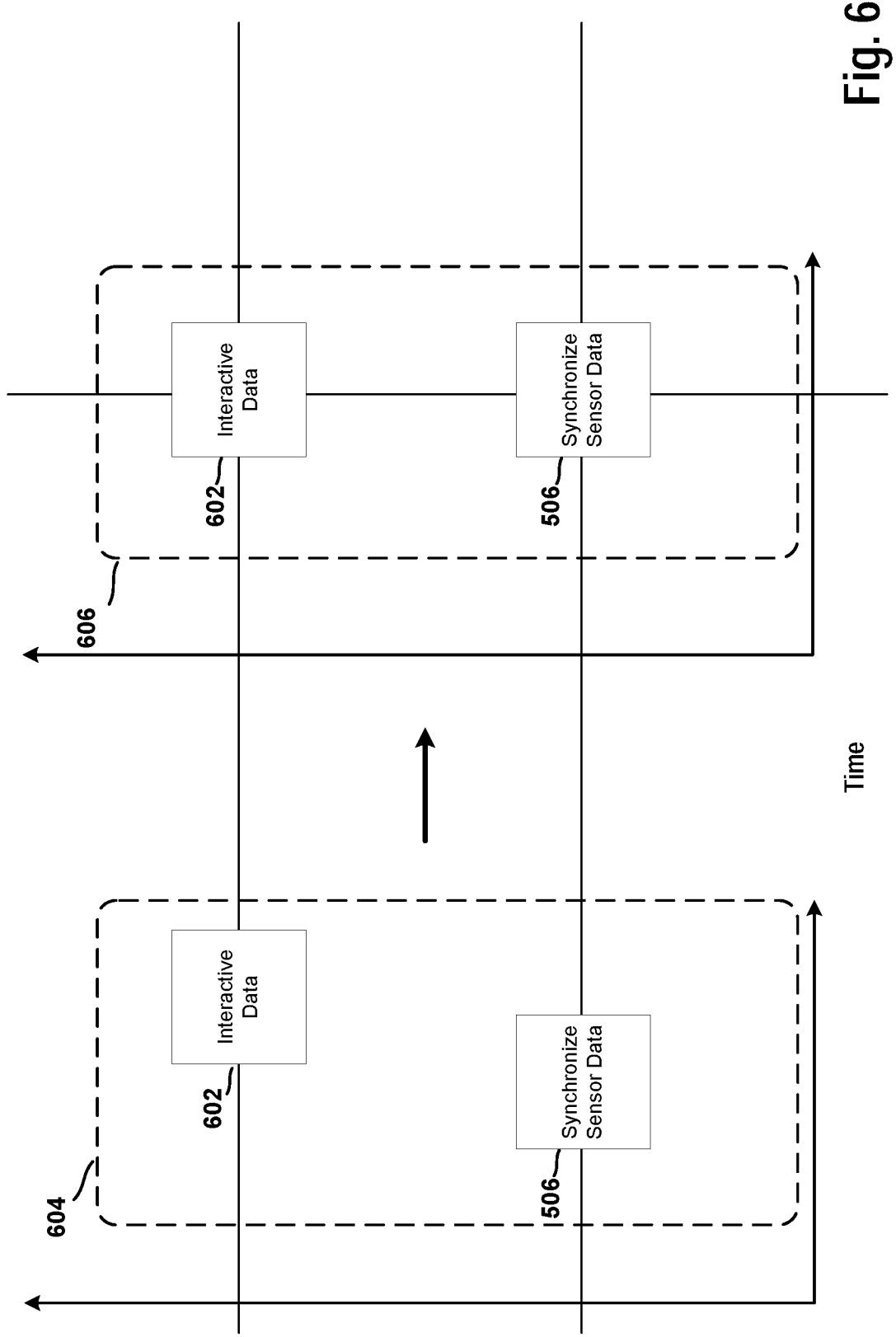
FIG. 6 illustrates an embodiment correlating the synchronized sensor data to interactive data that is presented in the game, in accordance with an implementation of the disclosure.

FIG. 6 illustrates an embodiment illustrating correlating the synchronized sensor data to interactive data (e.g., game state data) that is presented in the game while the user is playing the game. As shown in the figure, the synchronized data 506 and the interactive data 602 may be unaligned 604 when received by a server and used to create the engagement model 314. Because of the misalignment, this may cause inaccuracies in the engagement model 314 which may result in erroneous recommendations for the user 102. In one embodiment, the interactive data 602 may be received by the server before the synchronized data because there are delays associated with the transmission of the synchronized data 506. Similarly, the synchronized data 506 may be received by the server before the interactive data because there are delays associated with the interactive data 602.

Correlating the synchronized sensor 506 data with the interactive data 602 can prevent inaccuracies in the engagement model 314. For example, the interactive data 602 received by the server may represent a scene in the gameplay when a villain character is attacking the user in the game. However, the synchronized sensor 506 data may correspond to a different state in the game such as the user smiling in response to acquiring a new weapon. Because the synchronized sensor data 506 the interactive data 602 does not correspond to each other, the system may need to correlate the user's reaction (e.g. smiling) to the state in the game when the user acquires the new weapon rather than the state in the game when the user is being attacked by the villain character.

In some embodiments, correlating the synchronized sensor data to interactive data can be performed by applying a delay offset so that both datasets are substantially aligned 606. In one embodiment, correlating the synchronized sensor data and the interactive data can be performed by a machine learning model that has been trained to know the relative delays between the two datasets.

Figure 7:
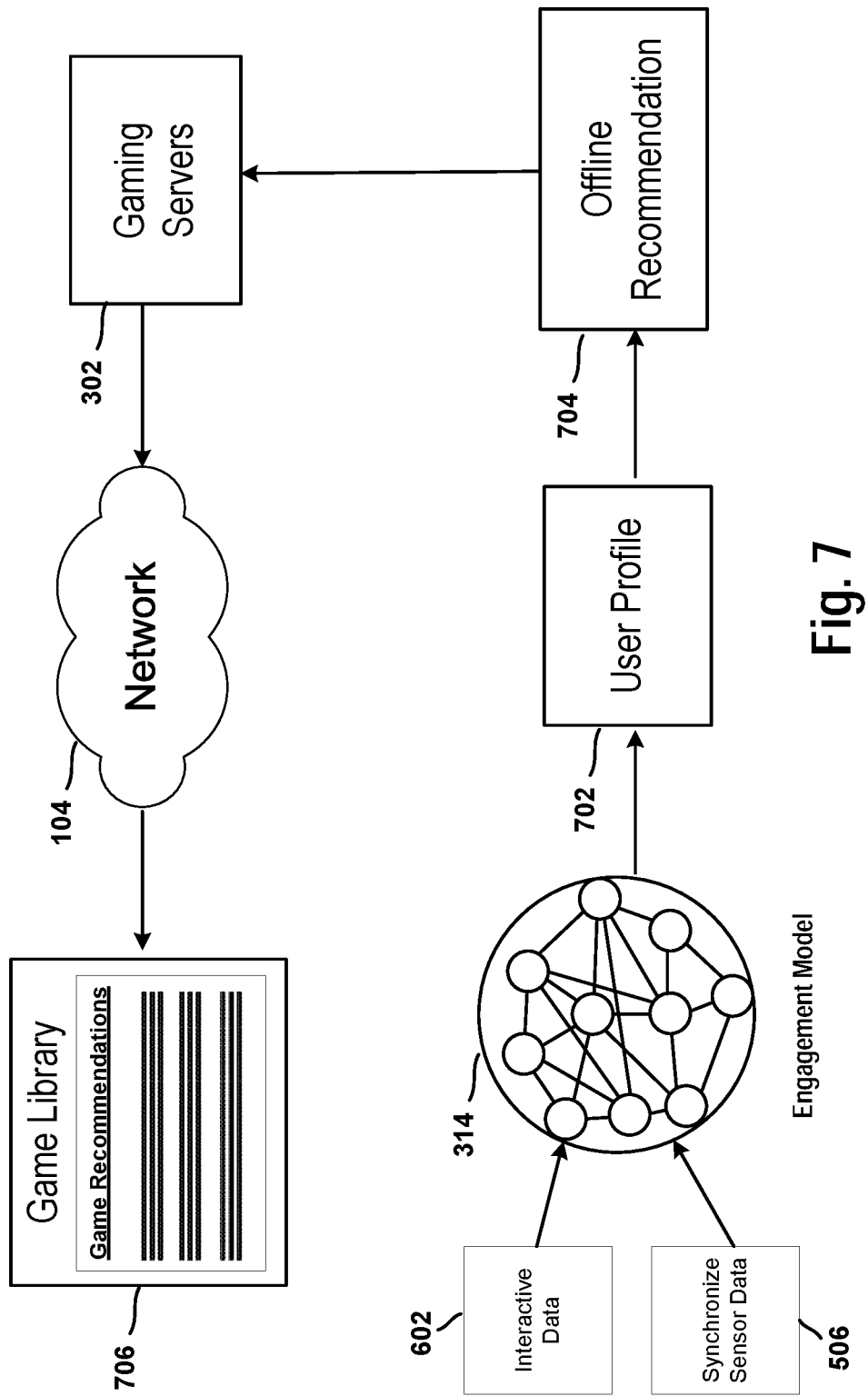
FIG. 7 illustrates an embodiment of a method for generating offline recommendations for a user, in accordance with an implementation of the disclosure.

FIG. 7 illustrates an embodiment of method for generating offline recommendations 704 for a user 102 related to a game using an engagement model 314, and additionally, the synchronized sensor data 506 and the interactive data 602. In one embodiment, the engagement model 314 implements one or more machine learning operations that ingest the synchronized sensor data 506 and the interactive data 602 as inputs. As discussed above, the synchronized sensor data 506 may include a plurality of sensor data (e.g., CID 324, VID 208, ISD 210, BMD 212, and CTL-ID 214) that is captured during the gameplay of the user 102. The interactive data 602 may include game state data that is presented in the game while the user 102 is playing the game. The interactive data 602 can provide the engagement model 314 with the context of the gameplay, the current state of the gameplay, and the upcoming scenes of the gameplay.

In some embodiments, the method further includes generating a user profile 702, using the engagement model 314 the synchronized sensor data, and the 506 interactive data 602. The user profile 702 is generated and tailored to each specific user 102 which can be built over time. The user profile 702 can include a plurality of information associated with the user 102 such as gaming history, performance attributes, skill level, sensor data, interests, preferences, likes, dislikes, history of interactive use of games that have been played by the user, etc.

In another embodiment, the method may further include generating offline recommendations 704 using the engagement model 314 which may be based on the synchronized sensor data 506, the interactive data 602, and the user profile 702. The offline recommendations 704 can be provided to the user 102 while the user is playing a game and/or can be accessible to the user after the gameplay. The offline recommendations 704 may include recommendations such as game recommendations, game strategies and tips, reporting metrics based on the games played, etc.

After generating the offline recommendations 704 for the user 102, the offline recommendations 704 can be transmitted to the gaming servers 302 over the network 104. In some embodiments, the method can access an online store (e.g., PlayStation Store) and retrieve a game library 706 that includes a list of game recommendations that are based on the offline recommendations 704. As noted above, the game library 706 can be provided to the user 102 while the user is playing a game or accessible by the user offline after the gameplay.

Figure 8:
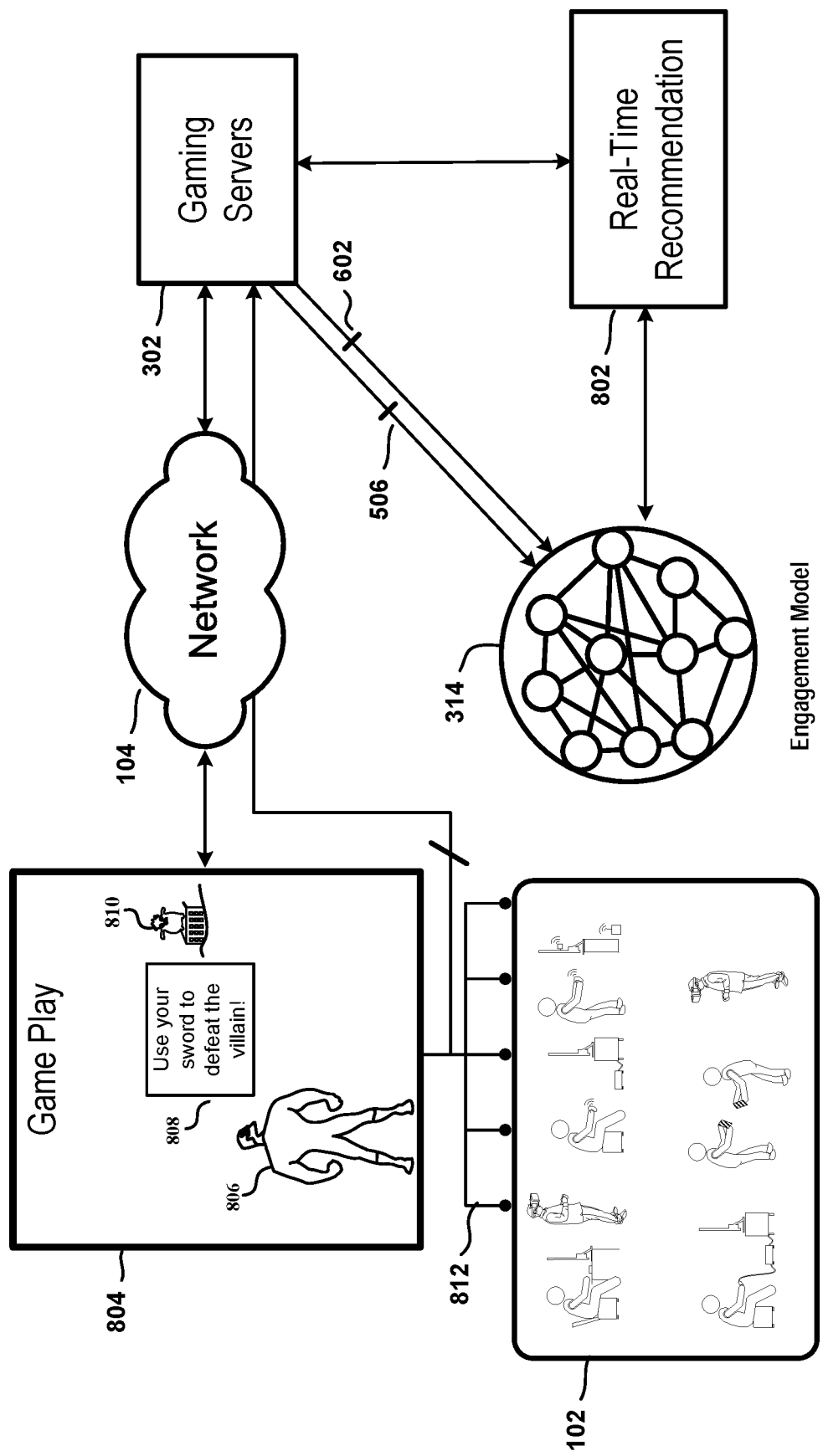
FIG. 8 illustrates an embodiment of a system generating real-time recommendations for a user, in accordance with an implementation of the disclosure.

FIG. 8 illustrates an embodiment of a system generating real-time recommendations for a user 102. The figure shows a method for generating real-time recommendations 802 using an engagement model 314, and additionally, using the synchronized sensor data 506 and the interactive data 602 as inputs. In one embodiment, during the gameplay of the user 102, a plurality of sensor data 812 is captured from the user 102 and transmitted to the gaming servers 302 over the network 104. As discussed above, in some embodiments, the plurality of sensor data 812 may be aligned to produce synchronized sensor data 506 which is then correlated to the interactive data 602.

The method then flows to engagement model 314 which is configured to receive as inputs the synchronized sensor data 506 and the interactive data 602. In some embodiments, other inputs that are not direct inputs may also be taken as inputs to the engagement model 314. The engagement model 314 may also use a machine learning model that is used to predict real-time recommendations 802 for the user 102 as the game is played by the user 102. The engagement model 314 may also be used to identify patterns, similarities, and relationships between the synchronized sensor data 506 and the interactive data 602. Using the patterns, similarities, and relationships, the engagement model 314 may be used to generate real-time recommendations 802 which may be beneficial to the user 102 such that it helps the user progress in the game. The real-time recommendations 802 may include a wide range of recommendations that may assist the user with the gameplay. Such recommendations may include tips and pointers on how to proceed with the game, strategies, statistics and metrics on game performance, etc.

For example, as shown in FIG. 8, a game scene 804 illustrates an avatar 806 of the user 102 encountering a villain 810. Using the synchronized sensor data 506 and the interactive data 602, the engagement model 314 can understand the context of the game scene and determine that the user 102 is eager to challenge the villain 810, however, the user 102 may not know how to proceed. To assist the user 102, the engagement model 314 may be used to generate a real-time recommendation 802 for the user 102 which can be provided to the user in the form of a floating icon 808 (e.g., use your sword to defeat the villain). After generating the real-time recommendation 802, the method further includes transmitting the recommendation to the gaming servers 302 over the network 104 which can be provided to the user 102 in real-time while the user is playing the game.

Figure 9:
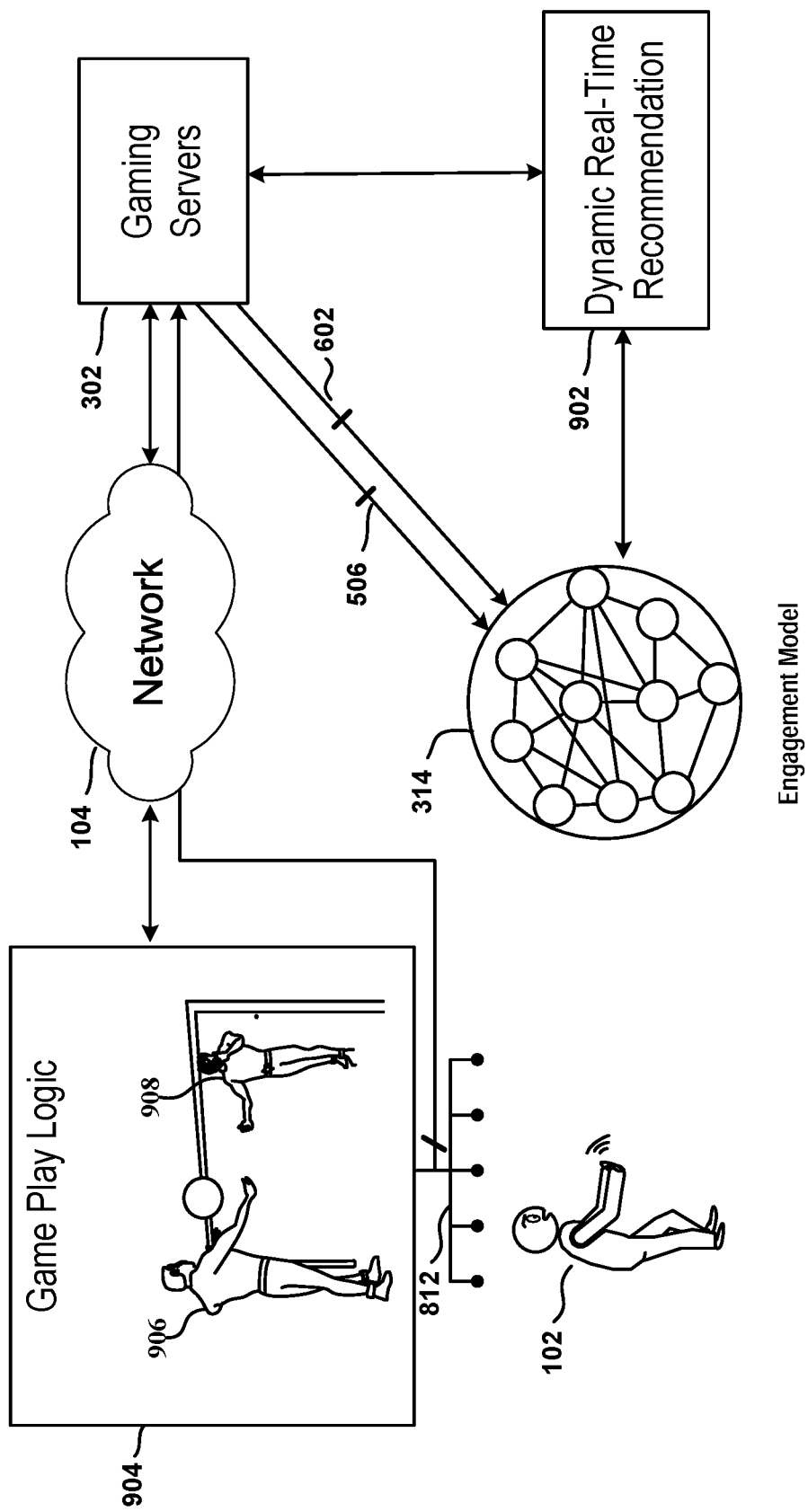
FIG. 9 illustrates an embodiment of a system generating dynamic real-time recommendations for a user, in accordance with an implementation of the disclosure.

FIG. 9 illustrates an embodiment of a system generating dynamic real-time recommendations for a user 102. In particular, the figure shows a method for generating real-time recommendations 802 using an engagement model 314, and additionally, using the synchronized sensor data 506 and the interactive data 602 as inputs. During the user's gameplay, a plurality of sensors are configured to capture the user's reactions during the gameplay. The captured sensor data, e.g., sensor data 812, can be transmitted to the gaming servers 302 over the network 104. As noted above, in some embodiments, the plurality of sensor data 812 can be aligned to produce synchronized sensor data 506 which is then correlated to the interactive data 602.

After producing the synchronized sensor data 506 and correlating the synchronized sensor data 506 to the interactive data 602, the method flows to the engagement model 314 which is configured to receive the synchronized sensor data 506 and the interactive data 602 as inputs. As noted above, in some embodiments, other inputs that are not direct inputs may also be taken as inputs to the engagement model 314. The engagement model 314 may use a machine learning model that is used to generate dynamic real-time recommendations 902 for the user 102 during gameplay. In addition, the engagement model 314 may also identify patterns and similarities between the synchronized sensor data 506 and the interactive data 602. Using the patterns and similarities, the engagement model 314 may be used to generate the dynamic real-time recommendations 902 which can be provided to the user during the gameplay.

In some embodiments, the dynamic real-time recommendations 902 can enhance the gameplay experience of the user 102 by suggesting a new level (e.g., easier or more difficult level) to play, changing the operation of the game by adjusting the game code to make it easier or more difficult to progress in the game. For example, as shown in FIG. 9, a game scene 904 illustrates an avatar 906 of the user 102 competing against an opponent 908 in a volleyball match. Using the synchronized sensor data 506 and the interactive data 602 as inputs, the engagement model 314 may be used to determine that the user 102 is disengaged in the game and that the game is too easy. To make the game more appealing to the user 102, the engagement model 314 can be used to generate a dynamic real-time recommendation 902 to adjust the game code to make the gameplay more challenging for the user 102. Similarly, the engagement model 314 can be used to determine whether the gameplay is too difficult for a user and can be used to generate a dynamic real-time recommendation 902 to adjust the game code to make the gameplay easier (e.g., minimizing button inputs to make gameplay easier) for the user 102.

In some embodiments, the adjustments to the game code can balance the gameplay of two users competing against each other who may have different gaming experience (e.g., intermediate vs. advance). This allows the users to compete at an even level which can make it more fun for both players. This may result in an increase in user engagement and encourage users with various gaming experiences to play together.

After generating the dynamic real-time recommendation 902, the method further includes transmitting the recommendation to the gaming servers 302 over the network 104 which can be incorporated in real-time while the user is playing the game.

It should be understood that some of these embodiments may be applicable to other types of content. For example, user captured parameters may also be obtained when a user is watching a video movie, or watching a commercial video, or generally watching any type of video.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for generating recommendations related to a game being executed by a cloud gaming service, comprising:

receiving, by a server, a plurality of sensor data captured during gameplay of the game by a user, each of the plurality of sensor data includes intensity information;

aligning, by the server, the plurality of sensor data to remove delays among the plurality of sensor data received by the server, wherein said removal of delays substantially removes offsets among said plurality of sensor data, wherein the offsets among the plurality of sensor data relate to delays by sensors in producing respective ones of said plurality of sensor data as received for processing by the server, wherein the aligning of sensor data is for each instance of the gameplay of game by the user;

correlating, by the server, the aligned sensor data to interactive data presented in the game while the user was playing the game, the correlating is configured to apply offsets that provide substantial alignment of the aligned sensor data and the interactive data; and processing, by the server, features from the aligned sensor data that was correlated with the interactive data, the features being classified and used to build an engagement model that identifies relationships between specific ones of the plurality of sensor data and the interactive data;

wherein the engagement model is used to generate a recommendation that relates to interactive data produced responsive to said gameplay by the user.

2. The method of claim 1, wherein the aligning the plurality of sensor data is performed using a machine learning model.

3. The method of claim 1, wherein the aligning the plurality of sensor data is performed by applying a delay weighting to one or more of said plurality of sensor data to adjust for offsets and to cause the plurality of sensor data to substantially align with respect to one another.

4. The method of claim 1, wherein the plurality of sensor data is captured using one or more of said sensors that are used to track an eye gaze, or a face expression, or a voice, or controller movement, or a body movement, or controller input associated with the user, or a combination of two or more thereof.

5. The method of claim 1, wherein the intensity information is associated with a change in reaction by the user as measured by a plurality of said sensors.

6. The method of claim 5, wherein the change in reaction is identified from two or more of the plurality of sensor data captured and occurring at substantially a same time frame.

7. The method of claim 1, wherein the intensity information associated with the plurality of sensor data is processed to define standardized values of intensity, the standardized values of intensity are comparable for different types of reactions captured by different ones of a plurality of said sensors.

8. The method of claim 1, wherein the correlating the aligned sensor data to interactive data is performed using a machine learning model.

9. The method of claim 1, wherein the recommendation is feedback to the user during gameplay, the recommendation includes information that is based on a prediction of actions that would improve results in the gameplay by the user.

10. The method of claim 1, wherein state data is generated for the interactive data, the state data captures a context of the game during gameplay by the user.

11. A method for generating recommendations for a game executed by a cloud gaming service, comprising:

receiving, by a server, sensor data for each of a plurality of users captured during gameplay of the game by the plurality of users, each of the sensor data for each of the plurality of user includes intensity information related to reactions made by respective users and sensor data from interactive data;

processing, by the server, features from the sensor data and interactive data from the game when the users played the game, the features being classified and used to build an engagement model that identifies relationships between specific ones of the sensor data and the interactive data; and processing, by the server, sensor data captured during a current gameplay by a user using the engagement model, the processing is configured to generate a recommendation to the user regarding an action to take to progress in the game during said current gameplay;

wherein said sensor data for each of the plurality of users that is received by the server is aligned with respect to one another of said sensor data, the aligning is used to remove offsets among the sensor data for receipt and processing by the server, wherein the offsets relate to relative delays by sensors associated by each of said plurality of users in producing respective ones of the sensor data, wherein after the sensor data is aligned for each user, said aligned sensor data of each user is respectively correlated to interactive data in the gameplay by the users so that reactions by each of the users is associated to a time in the interactive data for when the respective users produced the reactions.

12. The method of claim 11, wherein the intensity information is associated with a change in reaction from the plurality of users when measured by a plurality of said sensors.

13. The method of claim 12, wherein the change in reaction is identified from two or more of the sensor data captured and occurring at substantially a same time frame.

14. The method of claim 11, wherein the intensity information associated with the sensor data is processed to define standardized values of intensity, the standardized values of intensity are comparable for different types of reactions captured by different ones of a plurality of said sensors.

15. The method of claim 14, wherein the sensor data is captured using one or more of said sensors that are used to track an eye gaze, or a face expression, or a voice, or controller movement, or a body movement, or controller input associated with the user, or a combination of two or more thereof, and said intensity information is analyzed to identify changes in said reactions by said users.

16. The method of claim 15, wherein the change in intensity information is standardized among a plurality of said sensors to identify when said change in intensity information exceeds a predefined threshold.

17. The method of claim 11, wherein the aligning is performed using a machine learning model that learns delays in receipt of the sensor data by the server when captured by the sensors at client devices of the plurality of users.

18. The method of claim 11, wherein the recommendation is feedback to the user during gameplay, the recommendation includes information that is based on a prediction of actions that would improve results in the gameplay by the user based on a current context of gameplay by the user and reactions captured by the user.

19. The method of claim 11, wherein during the gameplay by the user, reactions of the user are captured by one or more sensors of a user device of the user and fed back to the server to improve the engagement model.

20. The method of claim 11, wherein state data is generated for the interactive data, the state data captures a context of the game during gameplay by the user.

* * * * *